(12) United States Patent
Kobayashi

(10) Patent No.: US 6,765,995 B1
(45) Date of Patent: Jul. 20, 2004

(54) TELEPHONE SYSTEM AND TELEPHONE METHOD

(75) Inventor: Yoshikazu Kobayashi, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 917 days.

(21) Appl. No.: 09/613,305

(22) Filed: Jul. 10, 2000

(30) Foreign Application Priority Data

Jul. 9, 1999 (JP) .......................................... 11-195912

(51) Int. Cl.[7] .............................................. H04M 1/64
(52) U.S. Cl. .................... 379/88.01; 704/231; 704/275; 704/501; 704/503
(58) Field of Search .......................... 379/88.01, 88.03, 379/88.04, 88.07; 704/201, 203, 214, 224, 226, 228, 231, 233, 234, 236, 237, 241, 243, 246, 251, 255, 257, 270, 270.1, 275, 501, 503, 504

(56) References Cited

U.S. PATENT DOCUMENTS

| | | | | |
|---|---|---|---|---|
| 4,975,957 A | * | 12/1990 | Ichikawa et al. | 704/220 |
| 5,432,883 A | * | 7/1995 | Yoshihara | 704/219 |
| 5,515,375 A | * | 5/1996 | DeClerck | 370/468 |
| 6,195,636 B1 | * | 2/2001 | Crupi et al. | 704/231 |
| 6,446,042 B1 | * | 9/2002 | Detlef et al. | 704/275 |

FOREIGN PATENT DOCUMENTS

JP   A 11-85196   3/1999

* cited by examiner

*Primary Examiner*—Roland Foster
(74) *Attorney, Agent, or Firm*—Young & Thompson

(57) ABSTRACT

A telephone set on a dialing side includes a voice channel control circuit for, in case that a telephone set on a termination side has a voice recognition function, setting a channel to which a voice signal is sent when the above-described telephone set on a termination side is phoned from the telephone set on a dialing side to a channel for transmitting only a normalized signal in a hybrid coding method.

19 Claims, 8 Drawing Sheets

IN CASE THAT SYNTHETIC VOICE IS REPRODUCED DURING RECEPTION

IN CASE THAT SYNTHETIC VOICE IS NOT REPRODUCED DURING RECEPTION

WAVEFORM CODING METHOD

HYBRID CODING METHOD

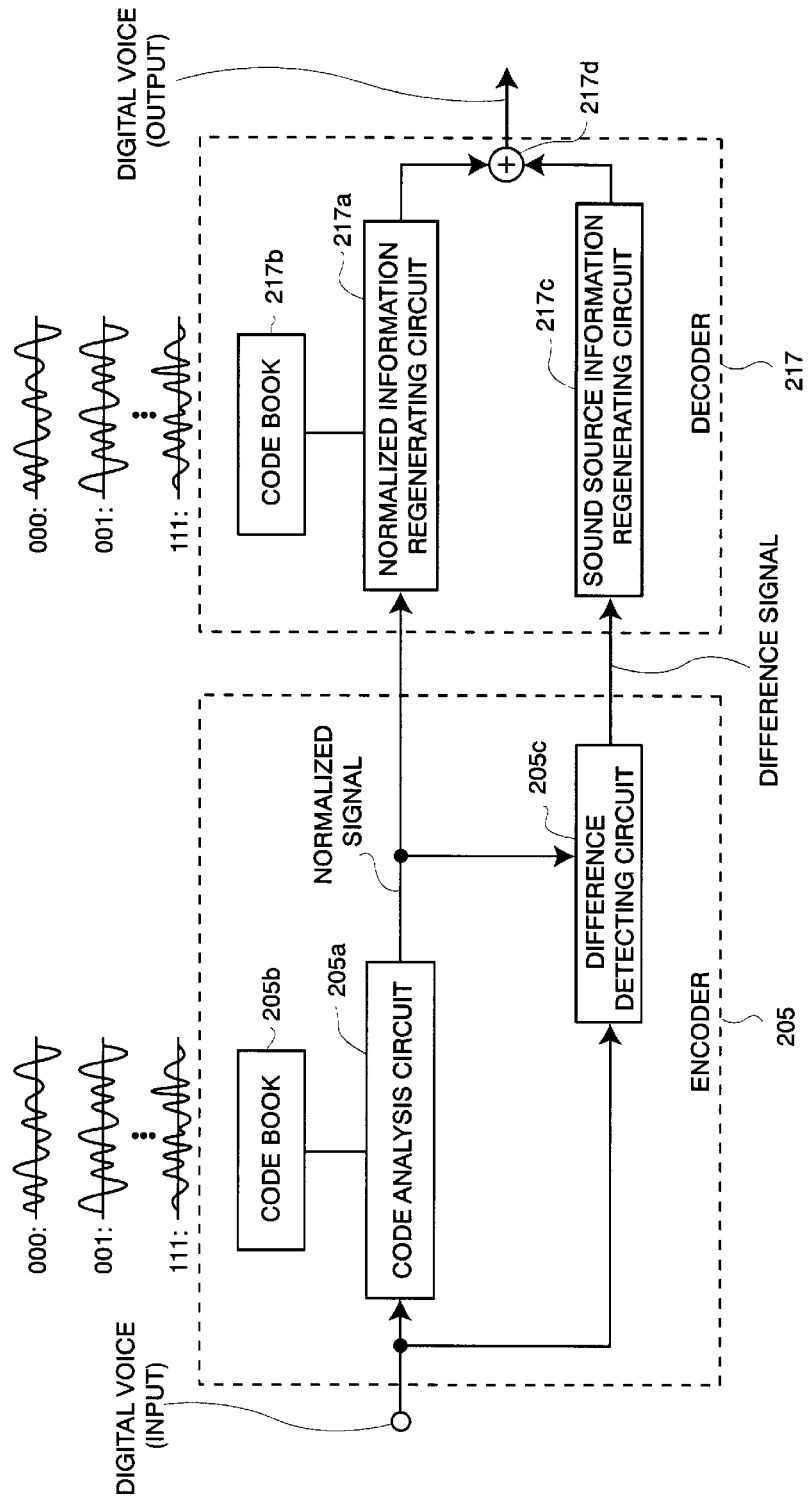

TELEPHONE SYSTEM AND TELEPHONE METHOD

BACKGROUND OF THE INVENTION

The present invention relates to a telephone system, and especially, to a telephone system having a voice recognition function which is used under transmission of a compressed voice signal.

CTI (Computer Telephony Integration) is being used, which is a system in which insufficient functions are mutually supplemented by integrating a system of a telephone (a PBX and so forth) and a system of information processing (a computer, a LAN and so forth) that were conventionally constructed separately. It is applied to reception work of a telecommunication sale company, telephone banking in a financial agency and so forth, for example, and saving of work is promoted by substituting conventional reception with a customer by an operator for a voice recognition device and a voice response device.

On the other hand, in such CTI, conversation by telephone via a conventional analog circuit is being changed to conversation by telephone (an internet phone and so forth) via a LAN, an ISDN, an internet and so forth. Accordingly, voice transmission by means of a conventional analog signal is shifting to voice transmission by means of a digital signal, and further, in order to suppress increase of transmission volume, a compression technology of voice is being used.

However, in a system in which a voice compression technology is applied to a voice recognition device, various tasks occur. Accordingly, such conventional tasks will be explained.

With regard to a technology of voice transmission by means of a digital signal, a unified standard is advised by a telecommunication standardization department (ITU-T) of an International Telecommunication Union (ITU). Presently, there are some standards, such as G.711 (PCM (:Pulse Code Modulation), 64 kbits/sec), G726 (ADPCM (:Adaptive Differential PCM), 32 kbits/sec), G.728 (LD-CELP (:Low Delay Code Excited liner Prediction), 16 kbits/sec), G.729 (CS-ACELP (:Conjugate Structure Algebraic CELP), 8 kbits/sec), and G.723.1 (MP-MLQ/ACELP, 6.3 k/5.3 k bits/sec). Out of them, a hybrid coding method, such as the G728, G.729 and G.723.1, has a higher compression ratio than that of a waveform coding method such as the G.711, and is expected to be a promising coding method in future.

FIGS. 6A an 6B are an explanation view for explaining a waveform coding method and a hybrid coding method. As shown in FIG. 6A, the waveform coding method is a method of conducting coding by sampling and quantizing a voice waveform. Accordingly, although, if a bit rate more than a certain value exists, voice of high quality can be obtained, there are tasks that a compression ratio is lowered by maintaining a high bit rate, and also, that voice quality is remarkably deteriorated when the bit rate is lowered.

On the other hand, as shown in FIG. 6B, the hybrid coding method is a method in which two kinds of information are complexly used, which are normalized information that is a previously prepared basic waveform pattern, and sound source information that is a difference between a waveform made of this normalized information and an original voice waveform. The normalized information is information in which for example a bit sequence of three bits is associated with the basic waveform pattern, and is stored in code books that are set on a transmission side and a reception side. Also, the sound source information is information provided by coding a difference by means of PCM between the original voice waveform and a waveform in which a plurality of basic waveform patterns are superimposed and rough shape of a voice waveform is reproduced, and is a signal including specific information of voice of a speaker, a background noise and so forth. Accordingly, since in the hybrid coding method most of parts of a voice waveform are represented by normalized information of about three bits, a compression rate of the hybrid coding method is higher than that of the waveform coding method. Also, by adding the sound source information that is a difference from the original voice waveform, there is an advantage that characteristic of voice of a speaker can be exactly reproduced, and voice of high quality can be produced.

As a telephone system in which such a hybrid coding method is adopted, there is a system which is defined in H.323. The H.323 is a standard of a conference system that is associated with a packet exchange network such as a LAN and an internet, based on H.320 that is international standard advice by ITU-T. It is mainly used for a personal computer conference system and so forth, and regards real-time characteristic as important. The G.723.1 and G.729 are corresponding to the coding of voice, and H.261 and H.263 are corresponding to the coding of an image.

FIG. 7 is a block diagram showing a conventional telephone system based on the H.323. As shown in the figure, the conventional telephone system is constructed of a telephone set 200 that is set on a side of a person who utilizes service, and a telephone set 201 for providing automatic response service of voice. The telephone set 200 and the telephone set 201 are connected to each other via a network 202 such as an internet. Also, a gate keeper 202a for conducting call control between the telephone sets, address conversion, bandwidth control and so forth is connected to the network 202.

The telephone set 200 is constructed of a microphone 203, an A/D converter 204, an encoder 205, a packeting device 206, a network interface card (referred to as an NIC, hereinafter) 207, a receiving buffer 208, a depacketing device 209, a decoder 210, a D/A converter 211, a speaker 212, and a call controller 213.

The telephone set 201 is a telephone set having an automatic voice response function, and is constructed of an NIC 214, a receiving buffer 215, a depacketing device 216, a decoder 217, a D/A converter 218, a speaker 219, a voice recognition and response device 220, an encoder 221, a packeting device 222, and a call controller 223.

The operation of such a conventional telephone set is as follows:

First, when the telephone set 201 is phoned from the telephone set 200, call control is conducted by the call controllers 213 and 223, and setting of a call, and so forth are conducted. Thereafter, information notification in relation to a terminal function is mutually conducted between the telephone set 200 and the telephone set 201, and a channel in relation to voice is set.

When voice is input to the microphone 203, the telephone set 200 on a dialing side converts it into an analog electric signal, and thereafter, supplies it to the A/D converter 204. The A/D converter 204 converts the supplied analog electric signal into a digital signal, and thereafter, supplies it to the encoder 205. The encoder 205 encodes the supplied signal, and thereafter, supplies it to the packeting device 206. The packeting device 206 packets the supplied signal, and thereafter, supplies a packet signal to the NIC 207. The NIC 207 transmits the supplied packet signal to the telephone set 201 via the network 202.

When receiving the packet signal from the telephone set 200, the NIC 214 of the telephone set 201 successively stores it in the receiving buffer 215. The depacketing device 216 reads out the packet signal stored in the receiving buffer 215, and converts it into a signal prior to being packeted and supplies it to the decoder 217. The decoder 217 decodes the supplied signal, and supplies it to the D/A converter 218 or the voice recognition and response device 220. In case that the signal is supplied to the speaker 219 via the D/A converter 218, the voice sent from the telephone set 200 can be heard also on a side of the telephone set 201. Also, the voice can be sent via a microphone 225 and an A/D converter 224.

The voice recognition and response device 220 conducts voice recognition of the signal supplied from the decoder 217, and makes a predetermined response. The voice recognition and response device outputs a synthetic sound (a digital signal) for example, in accordance with the voice recognition. The encoder 221 encodes the synthetic sound supplied from the voice recognition and response device 220, and supplies it to the packeting device 222. The packeting device 222 packets the supplied signal, and thereafter, supplied it to the NIC 214. The NIC 214 transmits the supplied packet signal to the telephone set 200 via the network 202.

The telephone set 200 that has received the packet signal from the telephone set 201 receives the packet signal by means of the NIC 207, and successively stores it in the receiving buffer 208. The depacketing device 209 reads out the packet signal stored in the receiving buffer 208, and converts it into a signal prior to being packeted. The decoder 210 decodes the supplied signal, and supplies it to the D/A converter 211. The D/A converter 211 converts the supplied signal into an analog electric signal, and thereafter, supplies it to the speaker 212, and thereby, a user can hear voice from the telephone set 201 via the speaker 212.

FIG. 8 is a block diagram showing a relation between the encoder 205 and the decoder 217. As shown in this figure, the encoder 205 includes a code analysis circuit 205a, a code book 205b, and a difference detecting circuit 205c. The decoder 217 includes a normalized information regenerating circuit 217a, a code book 217b, and a sound source information regenerating circuit 217c, and an adder 217d.

Accordingly, digital voice that has been input to the encoder 205 is analyzed in the code analysis circuit 205a, and a code is selected from the code book 205b, waveform shape of which is most closely akin to that of the digital voice. In the code books 205b and 217b, codes in which a bit sequence of three bits is associated with a basic waveform pattern are stored. The selected signal of three bits is output as a normalized signal. Also, the difference detecting circuit 205c calculates a difference between the digital voice signal and the normalized signal, and outputs the obtained difference as a difference signal. The normalized signal and the difference signal are input to the decoder 217. The normalized information regenerating circuit 217a reads out a waveform corresponding to the normalized signal from the code book 217b and outputs it, and the sound source information regenerating circuit 217c decodes the difference signal, and thereafter, outputs it. The adder 217d adds outputs from the normalized information regenerating circuit 217a and the sound source information regenerating circuit 217c to each other, and thereafter, outputs an added result.

In this manner, the conventional telephone system can reduce a data size by converting most of parts of the voice signal into the normalized signal. Also, by transmitting the difference signal, it is possible to send specific information of voice of a speaker, and there is an advantage that identification of the speaker on a reception side is facilitated.

However, in the telephone system in which such a hybrid coding system is used, there is a task that the voice recognition is made difficult. In other words, although the identification of a speaker becomes easy by using the difference signal, and natural voice which provides presence more is obtained since a background noise and so forth are added, such a difference signal is only a noise that hinders the voice recognition. Accordingly, a recognition rate is reduced by the addition of the difference signal, and there is a task that quality of services is deteriorated.

SUMMARY OF THE INVENTION

The present invention is for solving such tasks, and has the objective that a telephone system applicable to CTI work is provided, in which compressed voice can be certainly recognized.

In order to accomplish such an objective, in a telephone system, which is related to the present invention, for compressing a voice signal using a hybrid coding method and transmitting it, and including a telephone set on a dialing side and a telephone set on a termination side, which having a voice recognition function, the above-described telephone set on a dialing side includes a voice channel control circuit for, in case that the above-described telephone set on a termination side has a voice recognition function, setting a channel to which a voice signal is sent when the above-described telephone set on a termination side is phoned from the above-described telephone set on a dialing side to a channel for transmitting only a normalized signal in the above-described hybrid coding method.

The objective of the present invention is achieved by a telephone method for compressing a voice signal using a hybrid coding method and transmitting it, and including a telephone set on a dialing side and a telephone set on a termination side, which having a voice recognition function, characterized in that said telephone set on a dialing side, in case that said telephone set on a termination side has a voice recognition function, set a channel to which a voice signal is sent when said telephone set on a termination side is phoned from said telephone set on a dialing side to a channel for transmitting only a normalized signal in said hybrid coding method.

Also, other form shown below is included in the present invention.

In other words, the above-described telephone set on a termination side may include a voice response device for conducting a response by means of voice.

Also, the above-described telephone set on a termination side may be any one of a voice modem, a facsimile device which includes an automatic voice response function, a CTI server and an internet telephone gateway device.

Also, the above-described telephone system may be used for an internet telephone.

Also, the above-described hybrid coding method may be G.728 or G.729.

Also, the above-described encoder may include a code book in which a predetermined basic waveform pattern is stored, a code analysis circuit for analyzing a digital voice signal that has been input, and generating a normalized signal by referring to the above-described basic waveform pattern, and outputting it, and a difference detecting circuit for outputting a difference signal between the above-described digital voice signal and the above-described normalized signal, and the above-described decoder may include a code book in which a basic waveform pattern same as the code book in the above-described encoder, a normalized information regenerating circuit for decoding the above-described normalized signal that has been input by referring to the above-described basic waveform pattern, and outputting it, a sound source information regenerating circuit for decoding the above-described difference signal and outputting it, and an adder for adding outputs from the above-described normalized information regenerating circuit and the above-described sound source information regenerating circuit to each other and outputting it.

Furthermore, the above-described telephone set on a dialing side and the above-described telephone set on a termination side may transmit and receive information in relation to a terminal function to and from each other after call control is conducted therebetween, and the above-described telephone set on a dialing side may transmit a channel open demand of only the normalized signal to the above-described telephone set on a termination side, and when receiving the above-described channel open demand, the above-described telephone set on a termination side may send back channel open confirmation and transmit a channel open demand of a normalized signal and a difference signal to the above-described telephone set on a dialing side, and when receiving the above-described channel open demand, the above-described telephone set on a dialing side may send back channel open confirmation to the above-described telephone set on a termination side.

BRIEF DESCRIPTION OF THE INVENTION

This and other objects, features, and advantages of the present invention will become more apparent upon a reading of the following detailed description and drawings, in which:

FIG. 1 is a block diagram showing one embodiment of the present invention,

FIG. 2 is a block diagram showing a relation between an encoder and a decoder in relation to FIG. 1, FIG. 3 is a sequence view showing the operation of a telephone system in relation to FIG. 1, FIG. 4 is a flowchart showing the operation of a telephone system in relation to FIG. 1, FIG. 5A and FIG. 5B are flowcharts showing other embodiment in relation to the present invention, FIG. 6A is an explanation view for explaining a waveform coding method, FIG. 6B is an explanation view for explaining a hybrid coding method.

FIG. 8 is a block diagram showing a relation between an encoder and a decoder in relation to FIG. 7.

DESCRIPTION OF THE EMBODIMENTS

Next, embodiments of the present invention will be explained by using drawings.

Figure 1:
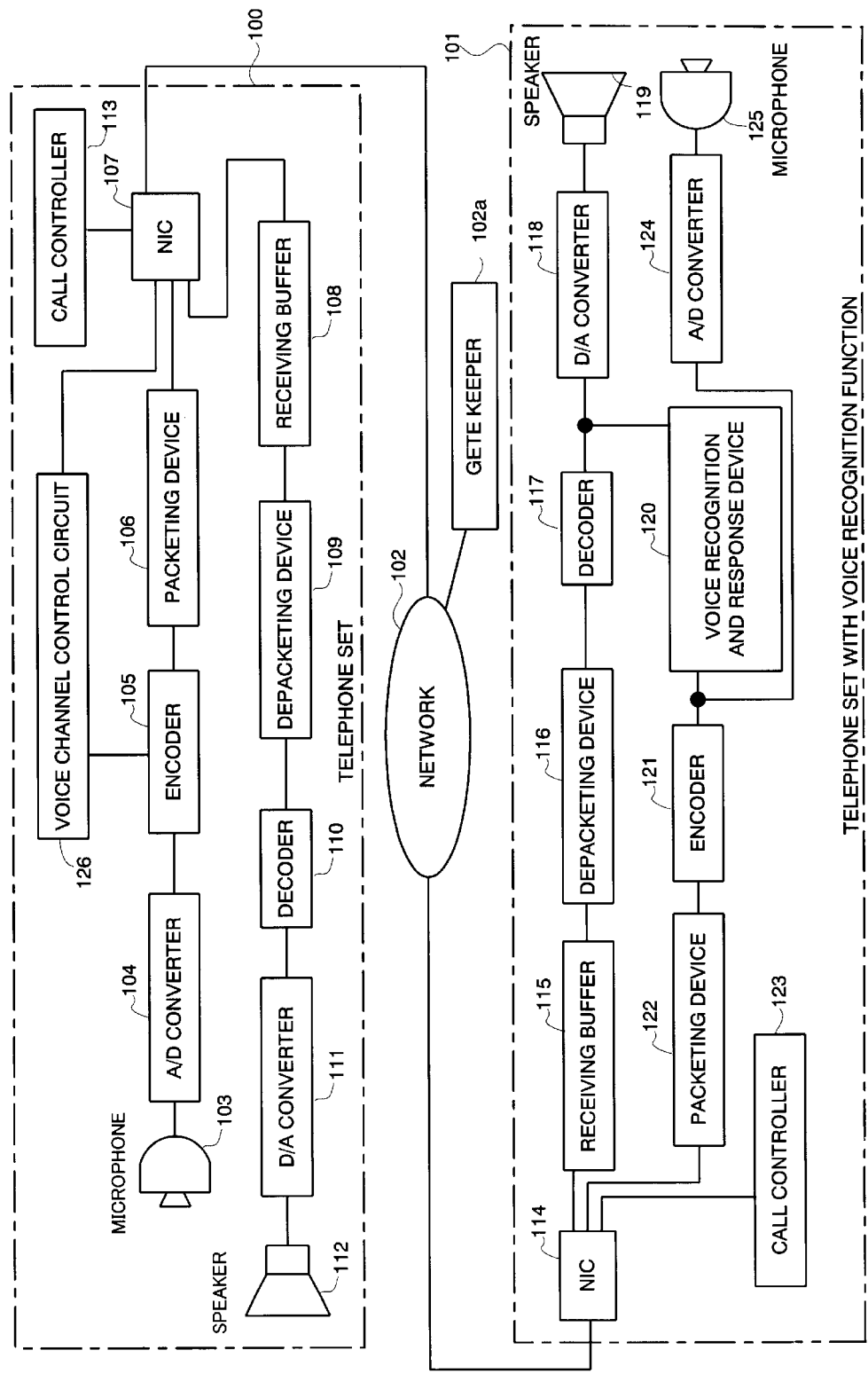

FIG. 1 is a block diagram showing one embodiment of the present invention. As shown in the figure, a telephone system which is related to the present invention is constructed of a telephone set 100 that is set on a side of a person who utilizes service, and a telephone set 101 for providing automatic response service of voice. The telephone set 100 and the telephone set 101 are connected to each other via a network 102 such as an internet and so forth. Also, a gate keeper 102a for conducting call control between the telephone sets, address conversion, bandwidth control and so forth is connected to the network 102.

The telephone set 100 is constructed of a microphone 103, an A/D converter 104, an encoder 105, a packeting device 106, an NIC 107, a receiving buffer 108, a depacketing device 109, a decoder 110, a D/A converter 111, a speaker 112, a call controller 113, and a voice channel control circuit 126.

The telephone set 101 is a telephone set having an automatic voice response function, and is constructed of an NIC 114, a receiving buffer 115, a depacketing device 116, a decoder 117, a D/A converter 118, a speaker 119, a voice recognition and response device 120, an encoder 121, a packeting device 122, and a call controller 123.

The operation of such a conventional telephone set is as follows:

First, when the telephone set 101 is phoned from the telephone set 100, call control is conducted by the call controllers 113 and 123, and setting of a call, and so forth are conducted. Thereafter, information notification in relation to a terminal function is mutually conducted between the telephone set 100 and the telephone set 101, and a channel in relation to voice is set.

When voice is input to the microphone 103, the telephone set 100 on a dialing side converts it into an analog electric signal, and thereafter, supplies it to the A/D converter 104. The A/D converter 104 converts the supplied analog electric signal into a digital signal, and thereafter, supplies it to the encoder 105. The encoder 105 encodes the supplied signal, and thereafter, supplies it to the packeting device 106. The packeting device 106 packets the supplied signal, and thereafter, supplies a packet signal to the NIC 107. The NIC 107 transmits the supplied packet signal to the telephone set 101 via the network 102.

When receiving the packet signal from the telephone set 100, the NIC 114 of the telephone set 101 successively stores it in the receiving buffer 115. The depacketing device 116 reads out the packet signal stored in the receiving buffer 115, and converts it into a signal prior to being packeted and supplies it to the decoder 117. The decoder 117 decodes the supplied signal, and supplies it to the D/A converter 118 or the voice recognition and response device 120. In case that the signal is supplied to the speaker 119 via the D/A converter 118, the voice sent from the telephone set 100 can be heard also on a side of the telephone set 101. Also, the voice can be sent via a microphone 125 and an A/D converter 124.

The voice recognition and response device 120 conducts voice recognition of the signal supplied from the decoder 117, and makes a predetermined response. The voice recognition and response device outputs a synthetic sound (a digital signal) for example, in accordance with the voice recognition. The encoder 121 encodes the synthetic sound supplied from the voice recognition and response device 120, and supplies it to the packeting device 122. The packeting device 122 packets the supplied signal, and thereafter, supplied it to the NIC 114. The NIC 114 transmits the supplied packet signal to the telephone set 100 via the network 102.

The telephone set 100 that has received the packet signal from the telephone set 101 receives the packet signal by means of the NIC 107, and successively stores it in the receiving buffer 108. The depacketing device 109 reads out the packet signal stored in the receiving buffer 108, and converts it into a signal prior to being packeted. The decoder 110 decodes the supplied signal, and supplies it to the D/A converter 111. The D/A converter 111 converts the supplied signal into an analog electric signal, and thereafter, supplies it to the speaker 112, and thereby, a user can hear voice from the telephone set 101 via the speaker 112.

Figure 2:
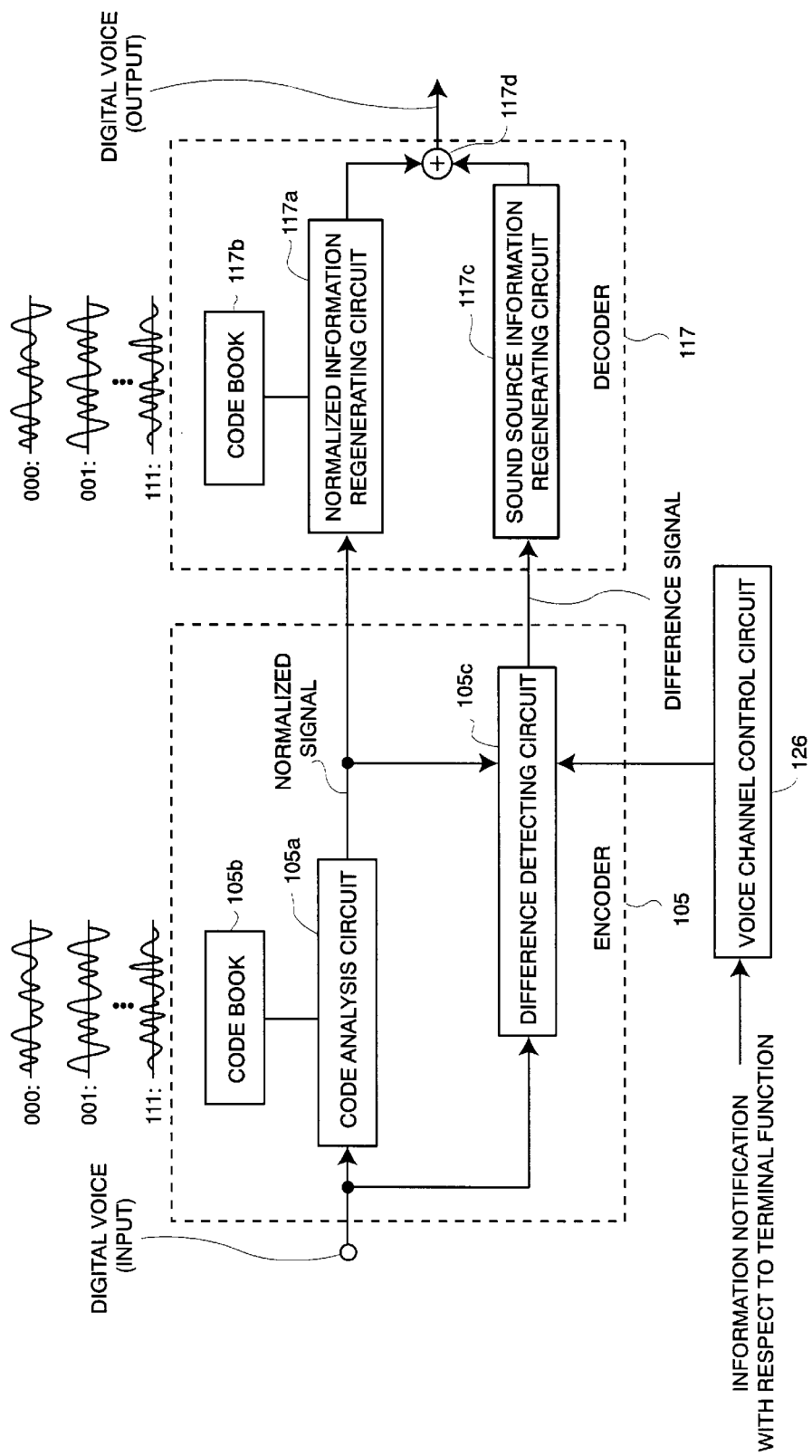

FIG. 2 is a block diagram showing a relation between the encoder 105, the decoder 117 and the voice channel control circuit 126. As shown in this figure, the encoder 105 includes a code analysis circuit 105a, a code book 105b, and a difference detecting circuit 105c. The decoder 117 includes a normalized information regenerating circuit 117a, a code book 117b, and a sound source information regenerating circuit 117c, and an adder 117d.

Accordingly, digital voice that has been input to the encoder 105 is analyzed in the code analysis circuit 105a, and a code is selected from the code book 105b, waveform shape of which is most closely akin to that of the digital voice. This code analysis circuit 105 conducts voice analysis in a unit of the kana syllabary, such as "a", "i" and "u" for example. Each word is represented by a simple substance of the selected code or a combination in which a plurality of the selected codes are combined. In the code books 105b and 117b, codes in which a bit sequence of three bits is associated with a basic waveform pattern are stored. However, the bit number is not limited to the three bits, and may be suitably set if necessary. The selected signal of three bits is output as a normalized signal.

Also, the difference detecting circuit 105c calculates a difference between the digital voice signal and the normalized signal, and generates and outputs the obtained difference of the voice signal to the normalized signal as a difference signal indicating an added value or a subtracted value. This difference signal may be a signal in which a value of a waveform difference is changed by means of A/D conversion or may be a signal that is replaced by an approximate tone. The packeting device 106 gets together the normalized signal and the above-mentioned difference signal corresponding to a sampling period of time of the normalized signal into one packet or a plurality of packets in accordance with a relation predetermined by instruction of the voice channel control circuit. For this relation, any one of a frame position, the sequence number and so forth may be used. The voice channel control circuit 126 conducts control of a voice channel.

The normalized signal and the difference signal are input to the decoder 117. The normalized information regenerating circuit 117a reads out a waveform corresponding to the normalized signal from the code book 117b and outputs it, and the sound source information regenerating circuit 117c decodes the difference signal, and thereafter, outputs it. The adder 117d adds outputs from the normalized information regenerating circuit 117a and the sound source information regenerating circuit 117c to each other, and thereafter, outputs an added result.

Figure 3:
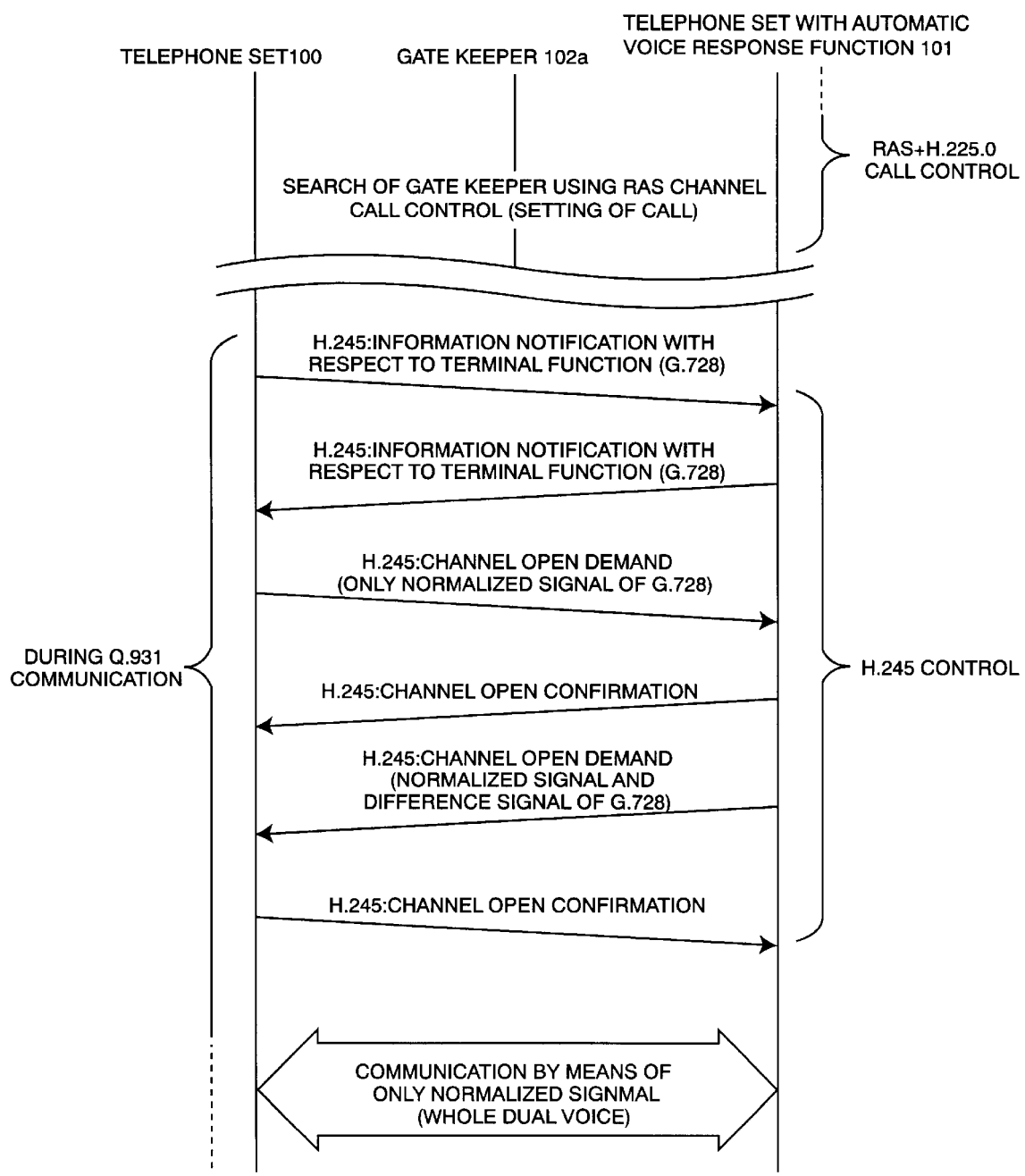
Figure 4:
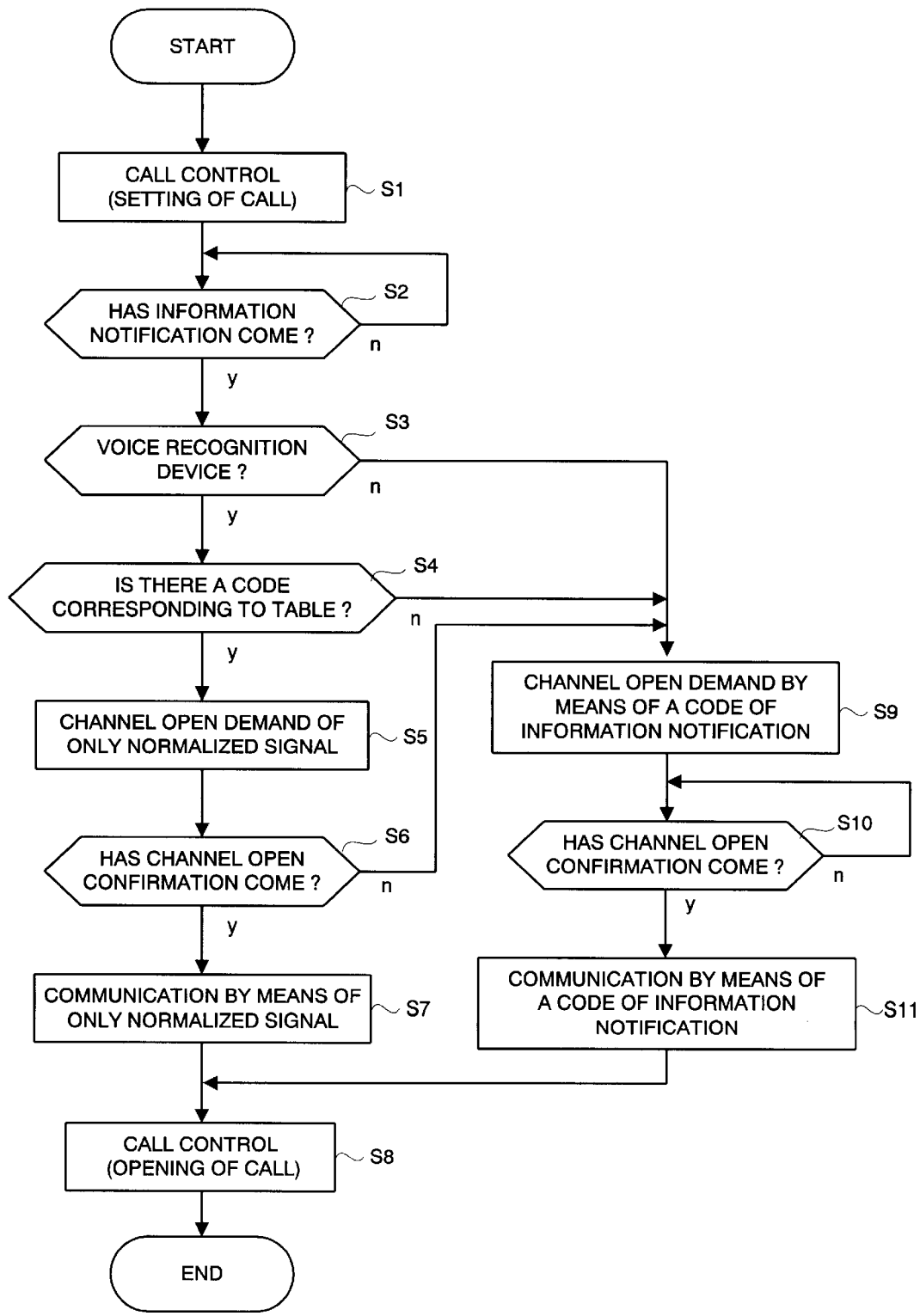

FIG. 3 is a sequence view showing the operation procedure of the telephone system in relation to FIG. 1. FIG. 4 is an operation flow of the telephone set 100.

First, call control is conducted by means of action of the call controllers 113 and 123. In other words, the existence of the gate keeper 102a is searched by using an RAS channel, and setting of a call is conducted by means of H.225.0 (STEP S1).

Next, in accordance with H.245, information notification with respect to a terminal function is transmitted to the telephone set 101 from the call controller 113 of the telephone set 100 via the NIC 107. In the same manner, information notification with respect to a terminal function is transmitted to the telephone set 100 from the call controller 123 of the telephone set 101 via the NIC 114. In this information notification with respect to the terminal function, there are an applicable range of a voice codec, a classification of a terminal, and so forth, for example.

As a result, the call controller 113 of the telephone set 100 can understand from the contents of the information notification that the telephone set 101 that was dialed is an automatic voice recognition device (STEPS S2 and S3). In this automatic voice recognition device, there are a voice information server (IVR: interactive response device), a FAX information server, a no-man's reception device, a no-man's transfer device and so forth.

Next, since the telephone set 101 is the automatic voice recognition device, the telephone set 100 demands channel open of only a normalized signal. At that time, in order to determine whether a code designated by the information notification is a hybrid code, the call controller 11 in the telephone set 100 refers to a voice codec table (Table 1) in the call controller 113. In addition, information in relation to Table 1 is stored and maintained in a memory set in the telephone set 100. Although this memory is not described in FIG. 1, it is set in the telephone set 100. As a result of the reference, if a coding method is G.728 or G.729, since the code is a hybrid code, the voice channel control circuit 126 demands channel open of only a normalized signal (STEP S5). If it is G.711, usual channel open is conducted. The telephone set 101 sends back confirmation for the channel open to the telephone set 100. When receiving the channel open confirmation from the telephone set 101, the telephone set 100 starts communication by means of only a normalized signal (STEPS S6 and S7). At this time, the encoder 105 and the voice channel control circuit 126 of FIG. 2 conduct voice (namely, voice in which there is no difference between speakers) communication by means of only a normalized code.

TABLE 1

| Channel open of only normalized signal | Usual channel open |
|---|---|
| G.728 | Other coding methods |
| G.729 | such as G.711 |

On the other hand, when the telephone set 101 is not a voice recognition device, there is not a code corresponding to that in the Table or the confirmation of the channel open cannot be obtained a channel open demand is issued by means of a code designated by the information notification, and when the channel open is established, communication is conducted by means of a code designated by the information notification (STEPS S9, S10 and S11). In addition, in the code designated by the information notification, there are G.711 and so forth, for example.

Next, since the telephone set 100 is a usual telephone set, in the telephone set 101, the call controller 123 demands channel open by means of a normalized signal and a difference signal. To the demand, the telephone set 100 sends back confirmation for the channel open to the telephone set 101.

As a result of the above, a channel going to the telephone set 101 from the telephone set 100 and a channel going to the telephone set 100 from the telephone set 101 become open, and a call by means of whole duality can be realized.

Next, other embodiment of the present invention will be explained.

Figure 5A:
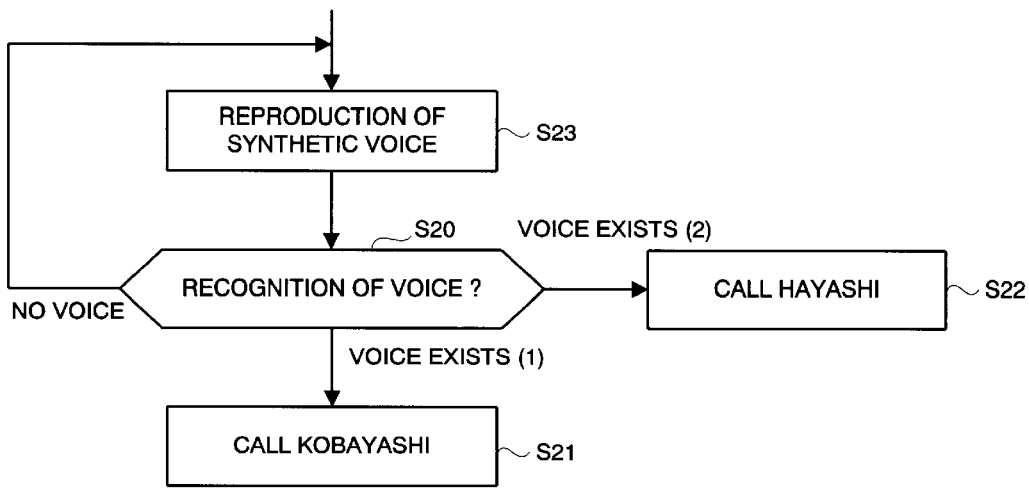
Figure 5B:
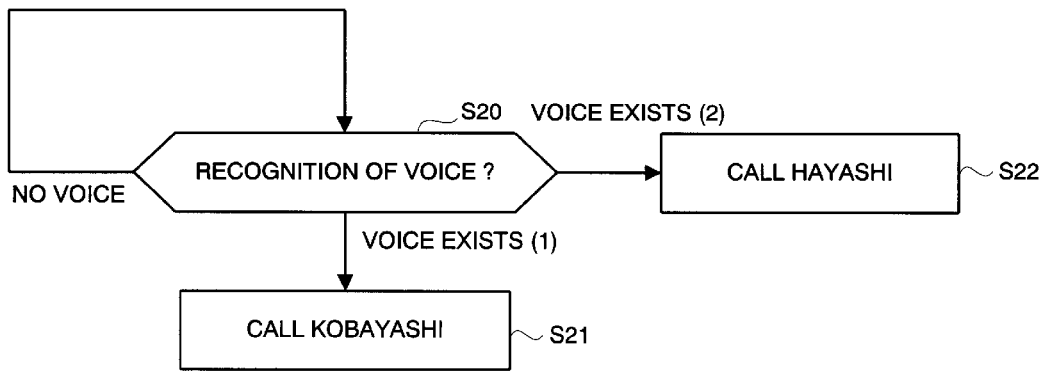
Figure 6A:
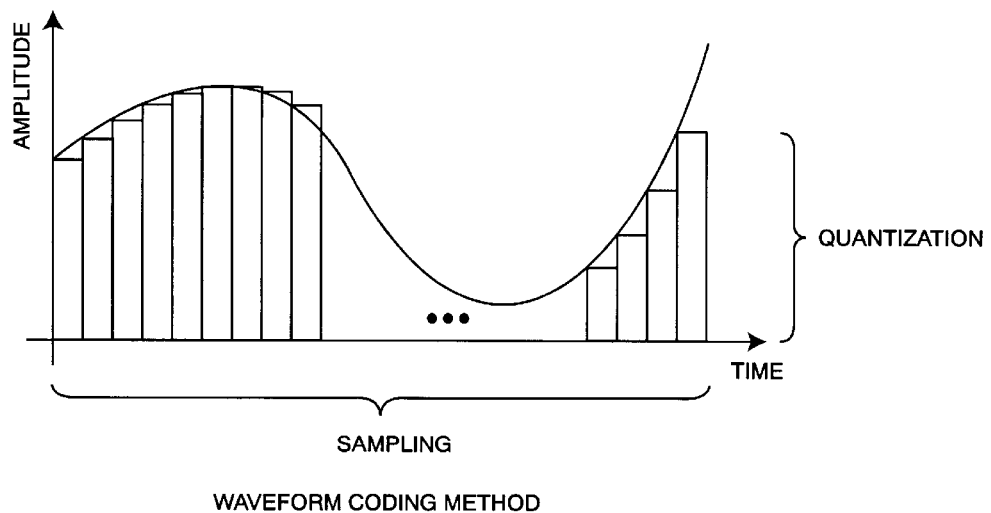
Figure 6B:
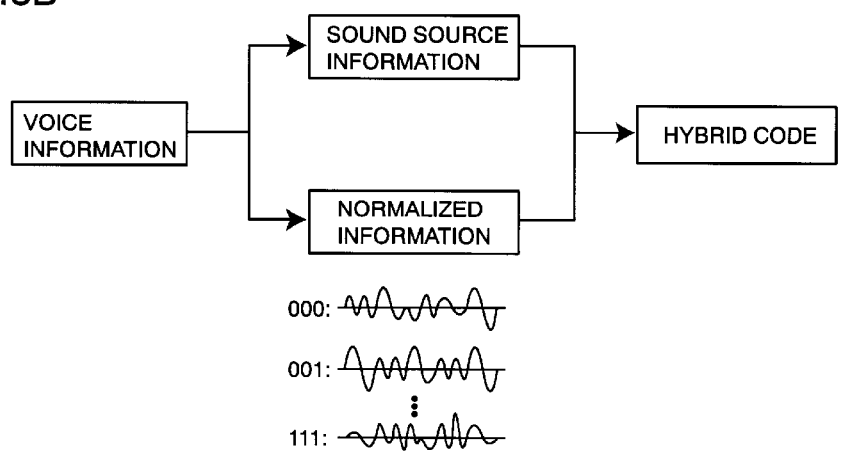
Figure 7:
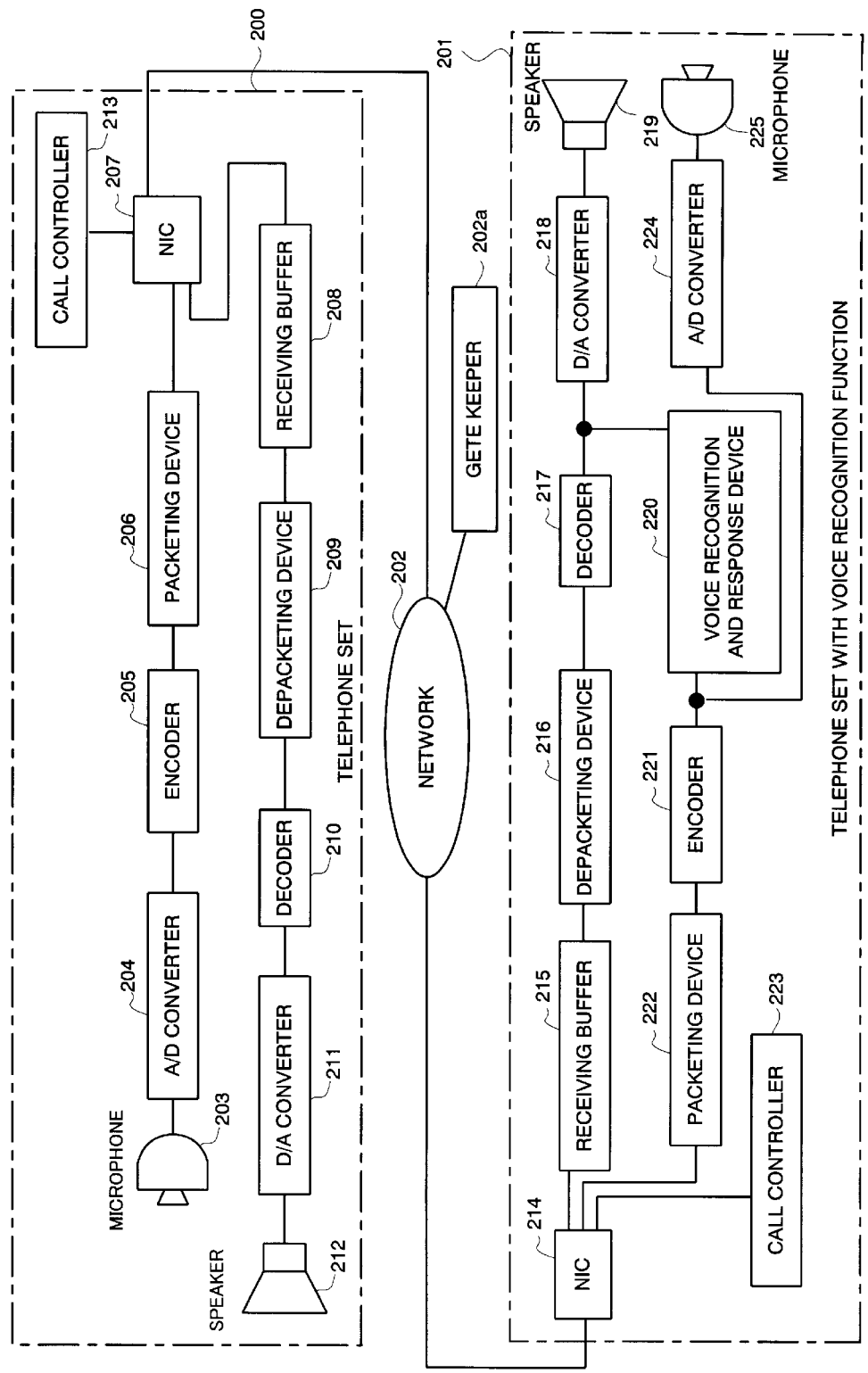
FIG. 7 is a block diagram showing a conventional example.

FIG. 5A and FIG. 5B are flowcharts showing other embodiment of the present invention.

As shown in FIG. 5A, when voice is received, the telephone set 101 in FIG. 1 recognizes the received voice and makes a response thereto by means of the voice recognition and response device 120. It makes a response, for example, "hello, this is oo speaking. If you would like to speak to Kobayashi, could you mention 1 ? If you would like to speak to Hayashi, could you mention 2 ? Please."

However, as shown in FIG. 5B, an arrangement may be simplified so as to have only a voice recognition function. For example, when the telephone set 101 is phoned, a speaker speaks any one of "1" and "2". If "1", a call is transferred to the corresponding telephone set (that is used by Mr. Kobayashi). If "2", a call is transferred to other telephone set (that is used by Mr. Hayashi).

In addition, the voice channel control circuit can be realized by means of software. Also, the telephone set 210 on a termination side may be an apparatus having an IVR (Interactive Voice Response) such as a FAX, a CTI server and an internet telephone gateway device having a voice modem or an automatic voice response function and so forth. Furthermore, the coding method is not limited to a method described above.

As explained above, the present invention includes the voice channel control circuit for, in case that the telephone set on a termination side has a voice recognition function, setting a channel to which a voice signal is sent when the telephone set on a termination side is phoned from the telephone set on a dialing side to a channel for transmitting only a normalized signal in the hybrid coding method.

Accordingly, in the telephone set on a termination side, individual difference information in the received voice is eliminated, and a voice signal by a specific speaker becomes to be received, and it is possible to improve a recognition rate of the voice.

What is claimed is:

1. A telephone system for compressing a voice signal using a hybrid coding method and transmitting it, and including a telephone set on a dialing side and a telephone set on a termination side, which having a voice recognition function,
   characterized in that said telephone set on a dialing side comprises a voice channel control circuit for, in case that said telephone set on a termination side has a voice recognition function, setting a channel to which a voice signal is sent when said telephone set on a termination side is phoned from said telephone set on a dialing side to a channel for transmitting only a normalized signal in said hybrid coding method.

2. A telephone system of claim 1, wherein said telephone set on a termination side comprises a voice response device for conducting a response by means of voice.

3. A telephone system of claim 1, wherein said telephone set on a termination side is a voice modem.

4. A telephone system of claim 1, wherein said telephone set on a termination side is a facsimile device which comprises a voice modem or an automatic voice response function.

5. A telephone system of claim 1, wherein said telephone set on a termination side is a CTI server.

6. A telephone system of claim 1, wherein said telephone set on a termination side is an internet telephone gateway device.

7. A telephone system of claim 1, wherein said telephone system is used for an internet telephone.

8. A telephone system of claim 1, wherein said hybrid coding method is G.728 or G.729.

9. A telephone system of claim 1,
   wherein said telephone set on a dialing side comprises an encoder, said encoder having;
      a code book in which a predetermined basic waveform pattern is stored,
      a code analysis circuit for analyzing a digital voice signal that has been input, and generating a normalized signal by referring to said basic waveform pattern, and outputting it and
      a difference detecting circuit for outputting a difference signal between said digital voice signal and said normalized signal, and
   wherein said telephone set on a reception side comprises a decoder, said decoder having;
      a code book in which a basic waveform pattern same as the code book in said encoder,
      a normalized information regenerating circuit for decoding said normalized signal that has been input by referring to said basic waveform pattern, and outputting it,
      a sound source information regenerating circuit for decoding said difference signal and outputting it and
      an adder for adding outputs from said normalized information regenerating circuit and said sound source information regenerating circuit to each other and outputting it.

10. A telephone system of claim 1, characterized in that said telephone set on a dialing side and said telephone set on a termination side transmit and receive information in relation to a terminal function to and from each other after call control is conducted therebetween,
   said telephone set on a dialing side transmits a channel open demand of only the normalized signal to said telephone set on a termination side,
   when receiving said channel open demand, said telephone set on a termination side sends back channel open confirmation and transmits a channel open demand of a normalized signal and a difference signal to said telephone set on a dialing side, and
   when receiving said channel open demand, said telephone set on a dialing side sends back channel open confirmation to said telephone set on a termination side.

11. A telephone method for compressing a voice signal using a hybrid coding method and transmitting it, and including a telephone set on a dialing side and a telephone set on a termination side, which having a voice recognition function,
   characterized in that said telephone set on a dialing side, in case that said telephone set on a termination side has a voice recognition function, set a channel to which a voice signal is sent when said telephone set on a termination side is phoned from said telephone set on a dialing side to a channel for transmitting only a normalized signal in said hybrid coding method.

12. A telephone method of claim 11, wherein said telephone method comprises the steps of:
   in said telephone set on a dialing side and said telephone set on a termination side, transmitting and receiving information in relation to a terminal function to and from each other after call control is conducted therebetween,
   in said telephone set on a dialing side, transmitting a channel open demand of only the normalized signal to said telephone set on a termination side, in said telephone set on a termination side, sending back channel open confirmation and transmits a channel open demand of a normalized signal and a difference signal to said telephone set on a dialing side when receiving said channel open demand, and in said telephone set on a dialing side, sending back channel open confirmation to said telephone set on a termination side when receiving said channel open demand.

13. A telephone method of claim 11, wherein said telephone set on a termination side conducts a response by means of voice.

14. A telephone method of claim 11, wherein said telephone set on a termination side is a voice modem.

15. A telephone method of claim 11, wherein said telephone set on a termination side is a facsimile device which comprises a voice modem or an automatic voice response function.

16. A telephone method of claim 11, wherein said telephone set on a termination side is a CTI server.

17. A telephone method of claim 11, wherein said telephone set on a termination side is an internet telephone gateway device.

18. A telephone method of claim 11, wherein said telephone system is used for an internet telephone.

19. A telephone method of claim 11, wherein said hybrid coding method is G.728 or G.729.

* * * * *